United States Patent [19]

Berghammer

[11] Patent Number: 4,675,583
[45] Date of Patent: Jun. 23, 1987

[54] CIRCUIT ARRANGEMENT FOR DRIVING AN ELECTRONICALLY COMMUTATED DC MOTOR

[75] Inventor: Maximilian Berghammer, Ullerting, Fed. Rep. of Germany

[73] Assignee: Siemens Aktiengesellschaft, Munich and Berlin, Fed. Rep. of Germany

[21] Appl. No.: 801,325

[22] Filed: Nov. 25, 1985

[30] Foreign Application Priority Data

Dec. 20, 1984 [DE] Fed. Rep. of Germany ....... 3446644

[51] Int. Cl.⁴ .............................................. H02P 6/02
[52] U.S. Cl. .................................... 318/254; 318/138; 318/439
[58] Field of Search ................... 318/138, 254 A, 254, 318/439

[56] References Cited

U.S. PATENT DOCUMENTS

| | | | |
|---|---|---|---|
| 3,942,083 | 3/1976 | Takahashi et al. | 318/138 |
| 4,025,835 | 5/1977 | Wada | 318/254 |
| 4,250,544 | 2/1981 | Alley | 318/254 X |
| 4,353,016 | 10/1982 | Born | 318/254 |
| 4,368,411 | 1/1983 | Kidd | 318/254 |
| 4,528,486 | 7/1985 | Flaig et al. | 318/254 |

FOREIGN PATENT DOCUMENTS 0063497 10/1982 European Pat. Off.
2067369 7/1981 United Kingdom.

*Primary Examiner*—William M. Shoop, Jr.
*Assistant Examiner*—Bentsu Ro
*Attorney, Agent, or Firm*—Hill, Van Santen, Steadman & Simpson

[57] ABSTRACT

For driving unipolarly operated windings of an electronically commutated dc motor, each of the windings has a final power stage allocated to it. The final power stages are driven selectively and in cyclical sequence via an analog multiplexer dependent on rotor position signals. A drive of the final power stages is defined via a control voltage supplied to a common input of the analog multiplexer. The final power stages are referenced to ground via a common intermediate resistor. A comparator having first and second inputs is provided. A current corresponding to a rated value of the motor current and defined by external drive signals is impressed on a control resistor connecting to the second input. The intermediate resistor connects to the first input. At the control resistor and at the intermediate resistor voltages are developed which correspond to the rated value and actual value respectively of the motor current and which are compared in the comparator. An output of the comparator is connected to the common input of the analog multiplexer.

16 Claims, 1 Drawing Figure

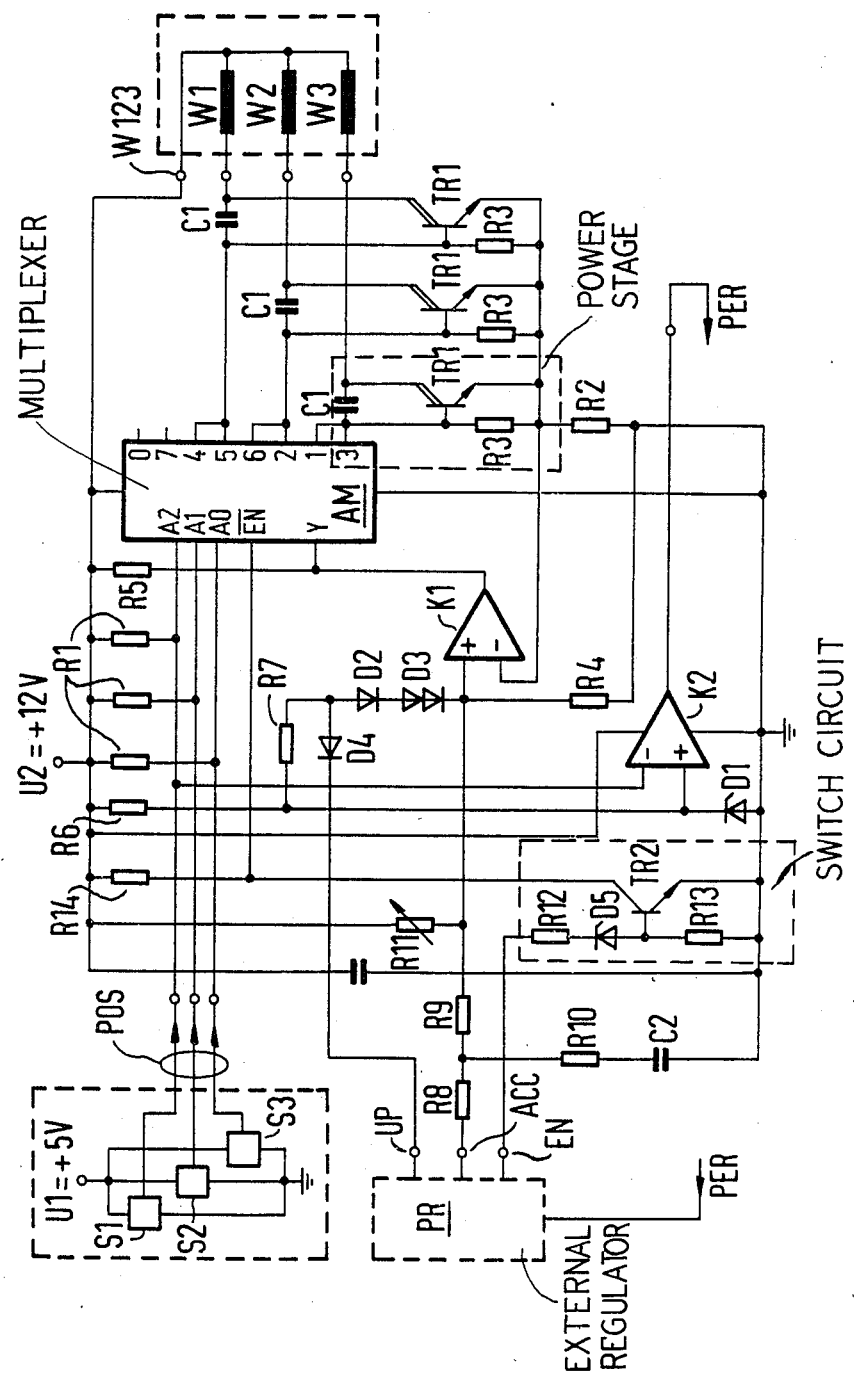

CIRCUIT ARRANGEMENT FOR DRIVING AN ELECTRONICALLY COMMUTATED DC MOTOR

BACKGROUND OF THE INVENTION

The invention relates to a circuit arrangement for driving an electronically commutated dc motor with unipolarly operated motor windings and wherein a power stage is allocated to each motor winding for driving thereof dependent upon a position of the rotor.

Electronically commutated dc motors, which are frequently also referred to as brush-less dc motors, are universally known. Usually, a multi-pole permanent magnet forms the rotor, and the stator comprises at least three pole legs which carry allocated motor windings. The motor can be fashioned as an inside or outside rotor motor. In any case, it has a stationary sensor plate as a detector for the rotor position, and is usually equipped with Hall elements which identify the respective position of the rotor. Dependent on the rotor position, the motor windings are selectively connected to a dc voltage source in cyclical succession with the assistance of a drive circuit.

DC motors of this type are preferably fractional horsepower motors, frequently only employed in smaller series, wherein the expense for the commutation, i.e., the drive of the windings, already represents a significant part of the overall cost of the product. A number of proposed solutions have therefore already been disclosed which, given a high efficiency, have as their objective a reduction of the expense for the commutation, whether this be in view of a particularly simple structure of the rotor position detector with a few Hall elements, or in view of the actual drive circuit in connection with suitable winding arrangements.

An example of such a proposed solution is known from U.S. Pat. No. 4,025,835, incorporated herein by reference, which discloses an electronically commutated dc motor comprising a two-pole or four-pole permanent magnet as a rotor, and a stator having three stator windings or three pair of stator windings connected in series or parallel. Given this known, brush-free dc motor, the commutation should occur by means of only two Hall elements. Regardless thereof, the dc motor disclosed herein is an example of the group of electronically commutated motors with unipolar drive wherein the currents through the stator windings always flow in only one direction. This simplifies the drive.

In general, it can be assumed that particularly cost-favorable solutions in such electronically commutated dc motors are strived for while setting other factors aside. However, there are also situations wherein, in addition to the manufacturing costs, it is particularly the technical features which are accorded special significance. It can be necessary to fashion the drive of the dc motor such that a fast run-up is guaranteed and that the speed can also be precisely regulated. Then, in particular, a predetermined nominal speed can be held exactly constant insofar as possible. It can also be possible that the dc motor is integrated into a device in more or less encapsulated form. In this situation, the stray power in the motor and in the corresponding drive circuit must be held optimally low so that the quantity of heat resulting from this stray power which must be dissipated remains within limits. Furthermore, a high reliability and freedom from faults can also be required. In order to achieve this, the drive circuit can cooperate with an external fault logic. Viewed in and of themselves, the traditional drive circuits for brush-less dc motors may in fact meet some of these individual demands. However, based on their format and structure, they are less suitable for doing justice to all of these boundary conditions which have been briefly mentioned.

SUMMARY OF THE INVENTION

It is an object of the present invention to create a circuit arrangement for the drive of an electronically commutated dc motor which, based on its design, is suitable for cooperating with external regulator or error detection units in order to thus achieve an optimally low-loss, precise and nonetheless reliable control means for such a dc motor. This should be achieved with low component expense.

In a circuit arrangement for driving an electronically commutated dc motor of the type referred to above, this object is achieved in accordance with the invention wherein a multi-channel analog multiplexer is provided having address inputs to which position signals are supplied indicating the position of the rotor. A common input is also provided in the analog multiplexer to which a control voltage is supplied for controlling output drive signal amplitude. The multipexer has a plurality of outputs which are selected dependent upon a combination of the position signals input thereto. Final power stages driving the motor windings are connected to the multi-channel analog multiplexer. Based on the assumption that a motor designed for three-phase which is unipolarly driven is employed, only three final power stages are used. These power stages are selectively driven via an analog multiplexer in cyclical succession, and with an impressed motor current value or amplitude so that the stray power of the motor is minimized. The analog multiplexer therefore fits into the current control loop in a simple fashion. As further developments of the invention show, an activation or de-activation input of the analog multiplexer can also be used in order to switch the final power stages into a high-resistance condition, and thus to reliably prevent a faulty start-up of the dc motor. The analog multiplexer has the further advantage that its operating voltage and its signal level lie relatively high, and thus a high signal-to-noise ratio is achieved for the position signals output by the Hall elements. Due to this property of the analog multiplexer which thus essentially defines the signal level in the drive circuit, techniques for level matching for input or output signals of the drive circuit are undertaken so that this circuit arrangement can also cooperate with external control or error detection circuits which have a lower operating voltage or signal level, and which can also be program-controlled.

BRIEF DESCRIPTION OF THE DRAWING

The drawing FIGURE shows a block circuit diagram of a circuit arrangement of the invention for driving brush-less dc motors in combination with corresponding circuit details of such a motor insofar as they are of significance for an understanding of the invention.

DESCRIPTION OF THE PREFERRED EMBODIMENTS

Brush-less dc motors are electronically commutated, i.e., the individual windings are alternately supplied with current dependent on the respective rotor position.

This usually occurs with the assistance of appropriately connected power transistors. For the exemplary application selected, the motor itself is provided in three-phase, i.e. three motor windings W1, W2, and W3 are provided in a star circuit, and are unipolarly operated. The common star point W123 is at operating voltage U2 = +12 V. In a traditional way, a sensor plate is integrated in the dc motor, this sensor plate being equipped with three Hall elements S1, S2, and S3. Upon rotation of the motor, these Hall elements, as is known, emit output signals which are here referred to as position signals POS since, as is known, they contain information in coded form regarding the respective position of the rotor.

These circuit details to be allocated to the dc motor are only shown schematically here in blocks indicated with broken lines, since they do not form part of the invention. In exactly this way, the drawing contains a further block referenced PR which schematically indicates an external regulator. This, for example, can be designed as a microprocessor, the programming of which allows corresponding signals to be derived from individual criteria, these signals being supplied to the drive circuit as external control signals.

The position signals POS are supplied to address inputs A0 through A2 of an analog multiplexer/demultiplexer which can be realized here with, for example, the integrated circuit MC 14051 B manufactured by the Motorola company. This circuit, which is referred to below as an analog multiplexer AM, has 8 channels, i.e., it has 8 independent inputs/outputs which are only employed as signal outputs in the exemplary embodiment and are referenced 0 through 7, and also comprises a common input/output Y which is accordingly only employed as an input. The signal combination at the address inputs A0 through A2 is decoded as a selection signal for one of the independent outputs, this being selected and electrically connected through to the common input Y.

In the present example, the Hall elements S1, S2, and S3 operated with a lower operating voltage U1=5 V emit respective output signals whose status indicates that a north or a south pole of the permanent magnet of the brush-less dc motor lies opposite thereto. Since in the exemplary embodiment the output circuits of the Hall elements are designed as circuits with an open collector, a separate load resistor R1 is connected to each of these outputs. This load resistor R1 is at a first operating voltage U2 and thus raises the signal up to the level of the analog multiplexer AN. In addition to pure level matching, an improvement of the signal-to-noise ratio is thus achieved at the same time. One of the eight independent outputs is selected with the assistance of the position signals POS supplied to the address inputs A0 through A2 of the analog multiplexer AM. Six of these outputs are connected parallel in pairs. In accordance with the illustration in the block circuit diagram, this pairing is selected on the basis of the function table of the known circuit such that a pair of outputs connected in parallel is selectively activated so as to produce appropriate driving signals in cyclical sequence whenever two of the three position signals POS currently have different statuses in a cyclical interchange. This circuit diagram results in a known way from the rules for electronic commutation.

A final power stage Tr1, R3, and C1 is connected to each of these outputs interconnected in pairs, this final power stage being fashioned in the form of a Darlington circuit. In each of these final power stages, a power transistor TR1 has its base connected directly and parallel to the two allocated, independent outputs of the analog multiplexer AM. The collector-emitter path of this power transistor TR1 is connected to the allocated winding W1, W2, or W3 on the one hand, and on the other hand, is applied to ground via an intermediate resistor R2 allocated in common to all final power stages. A base-emitter resistor R3 is situated between the base and emitter of every power transistor TR1, this base-emitter resistor R3 reliably inhibiting the corresponding power transistor TR1 in the non-selected condition of the final power stage. Finally, a respective smoothing capacitor C1 is connected between the collector of each of the power transistors TR1 and the allocated, parallel-connected pair of outputs of the analog multiplexer AM. This capacitor insures a removal of the edges of the current pulse given cut-in or cut-out operations of the allocated power transistor TR1.

Although it is thus set forth how the three windings W1, W2, and W3 of the motor connected in the star are supplied with impressed current in proper phase, nothing has yet been said regarding the control of the amplitude of the motor current i, and thus of the speed regulation of the dc motor. This shall be explained below. The actual value of the motor current (amplitude) i is proportional to the voltage drop at the intermediate resistor R2 shared by the three final power stages. This voltage drop is compared by use of a first comparator K1 to a control voltage which drops off at a further resistor R4 which shall be referred to as a control resistor in the future. This resistor and the intermediate resistor R2 are connected in common to ground. They are also connected to one of the two mutually inverse comparator inputs of the comparator K1. The comparator K1 compares the two voltages supplied to its inputs and emits a corresponding output signal.

It is assumed in the illustrated exemplary embodiment that the output stage of this comparator comprises an open collector, and a further load resistor R5 is therefore connected between the operating voltage U2 and the comparator output. This further load resistor R5 raises the signal at the comparator output up to the level of the analog multiplexer AM. At the same time, the comparator output is directly connected to the common input Y of the analog multiplexer AM. Thus, the power transistor TR1 of a selected final power stage is supplied with current at its base such that a voltage equality results. In other words, the value or amplitude of the motor current i results from the relationship between the control voltage dropping off at the control resistor R4 and the value of the intermediate resistor R2.

A corresponding current is then impressed on the control resistor R4. This essentially occurs via two external control inputs of the drive circuit—the inputs UP and ACC connected to the regulator PR, in combination with a diode-resistor network connected to the control resistor R4. This network first contains a further resistor R6 and a Zener diode D1 which are situated in a series connection between the operating voltage U2 and ground such that a stabilized dc appears at their junction. This stabilized dc is supplied to the control resistor R4 via a resistor-diode combination formed of a further resistor R7 and diodes D2 and D3. A coupling diode D4 is connected at the junction between the further resistor R7 and the diode D2, this coupling diode D4 being also connected to the first control input UP.

This technique provides electrical connection compatibility to most digital circuit families.

The coupling diode D4 is inhibited as soon as an adequately high, positive potential (=logical H level) is applied to this first control input UP. The current prescribed by the stabilized dc and the value of the resistor R7 is thus impressed on the control resistor R4. As a consequence of this impressed current, the power transistor TR1 in a selected final power stage TR1, R3 is fully driven, i.e., the final power stage draws maximum current and thus causes the fastest possible run-up of the dc motor which is practically possible. When, in the opposite case, a low potential (=logical L-level) is applied to this first control input UP and thus the coupling diode D4 is biased in a forward direction, then the impressed current is diverted via this diode. The diode D3 is thus inhibited and the control resistor R4 is current free.

The actual control input for the regulated operation is the second control input ACC. A T pattern circuit formed of three further resistors, the series resistors R8 and R9 and the shunt resistor R10, as well as of a further capacitor C2, is connected to this second control input. The capacitor C2 is situated between the shunt resistor R10 and ground. The terminal of the second series resistor R9 facing away from the second input ACC is connected to the control resistor R4 and to the positive operating voltage U2 via a balance resistor R11.

The control signal supplied to the second control input ACC is a digital pulse signal having a low level of 0 V and a high level of +5 V. A high level of the second control signal ACC impresses a current on the control resistor R4 which causes a boost of the nominal current $i_N$ amplitude by an amount $\Delta i$ and thus causes a corresponding acceleration of the motor. In the inverse case, the nominal current $i_N$ amplitude given a low level of the digital pulse signal at ACC is diminished by an amount $\Delta i$, and thus the motor is decelerated.

A balancing of the current impressed on the control resistor R4 to the nominal value $i_N$ occurs since a potential of +2.5 V is supplied to the second control input ACC during this setting operation and the balancable resistor R11 is set such that the nominal value $i_N$ for the motor current corresponding to the nominal operation or to the nominal speed of the dc motor is reached. The drive is improved by the RC element formed of the shunt resistor R10 and the second capacitor C2. This reduces the loop gain of the speed regulating circuit at high frequencies and thus increases the control stability. Beyond this, the second capacitor C2 acts as an integrator for the width-modulated digital pulse signal supplied to the second control input ACC, so that this digital pulse signal is converted into the actual, analog control voltage for regulating the motor current.

Finally, the illustrated drive circuit also comprises a third external control input EN which is again connected to the regulator PR. The signal supplied via this third control input EN is the actual activation signal for the drive circuit. It is supplied to a transistor switching stage TR2 via a base-emitter network composed of a series connection of two further resistors R12 and R13 connected via a further diode D5. The emitter-collector path of the transistor switching stage TR2, together with a collector resistor R14, lies between the operating voltage U2 and ground. The collector is also connected to an activation input EN of the analog multiplexer AM.

The switching network connected to the third control input EN first serves the purpose of a level matching between the output signal of the regulator PR and the input signal of the analog multiplexer AM. Apart from this, however, the switching status of the final power stages TR1, R3 is defined by the supplied activation signal. Given a low level of the control signals supplied to this third control input EN, the analog multiplexer AM is fundamentally inhibited, so that none of the final power stages can be driven. The drive circuit is activated only given a high level at the third control input EN. The switching threshold is defined by the base-emitter voltage at the transistor switching stage TR2 determined with the described resistor-diode network R12, R13, D5.

Finally, as shown in the drawing, a second comparator K2 is provided which generates a reference signal PER supplied to the regulator PR, this reference signal PER corresponding to the momentary speed of the controlled dc motor. For this purpose, the afore-mentioned, stabilized dc is supplied to one of the two inputs of this second comparator K2, and one of the position signals POS is supplied to the second comparator input. As initially set forth, the position signals supplied to the analog multiplexer AM are drawn up to the high 12 V level of the operating voltage U2. On the other hand, the input signals for the regulator PR are TTL signals having a level of 5 V. From the position signals POS supplied to it, the second comparator K2 forms a control signal with reduced level by comparison with the stabilized dc as reference voltage, this control signal with reduced level being used in the regulator PR for measuring the period duration. In other words, the momentary actual speed of the motor is derived from the reference signal PER, whereby the regulator PR then identifies a deviation from a defined nominal speed and, for a correction, generates the control signal with corresponding polarity which is supplied to the second control input ACC.

The described control circuit can be monolithically integrated for an output current of less than 3 A. When higher output currents are demanded, an integration in the form of a layer circuit is the most practical way for reducing the structural volume. A heat sink which can be integrated into the layer circuit allows the problem of stray heat of the final power stages to be resolved in a structurally simple way and to thus contribute to a cost-favorable overall solution.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for driving an electronically commutated dc motor with unipolarly operated motor windings, comprising:
    a dc voltage source;
    a final power stage allocated to each of the motor windings;
    selection network means for connecting the dc voltage source to selected motor windings in a cyclical sequence through control of the respective final power stage and dependent on rotor position signals supplied to the selection network means;
    means for creating the rotor position signals dependent on a position of a rotor of the motor;

said selection network means comprising a multi-channel analog multiplexer means having address inputs to which said position signals are supplied, a common input to which a control voltage is supplied, and a plurality of independent outputs, said multi-channel analog multiplexer means selecting the independent outputs at which driving signals are to be present based upon a combination of said position signals, and said selection network means controlling amplitudes of said motor drive signals at said independent outputs based on the position of the rotor and the supplied control voltage so as to control rotational speed of the motor based on amplitudes of the individual driving signals, said individual driving signals controlling said final power stages; and said final power stages being connected to the respective independent outputs of said multi-channel analog multiplexer means and each of said power stages having means for controlling amplitude of motor current through said windings dependent on said driving signal amplitudes.

2. A circuit arrangement according to claim 1 wherein a switch means is provided which is actuated by an external cut-in signal, the switch means being connected to an activation input of the multiplexer means, said switch means reliably deactivating the multi-channel analog multiplexer means given absence of the external cut-in signal.

3. A circuit arrangement for driving an electronically commutated dc motor with unipolarly operated motor windings, comprising:

a dc voltage source;

a final power stage allocated to each of the motor windings;

selection network means for connecting the dc voltage source to selected motor windings in a cyclical sequence through control of the respective power stage and dependent on rotor position signals supplied to the selection network means;

means for creating the rotor position signals dependent on a position of a rotor of the motor;

said selection network means comprising a multi-channel analog multiplexer means having address inputs to which said rotor position signals are supplied, a common input to which a control voltage is supplied, and a plurality of independent outputs, said multi-channel analog multiplexer means selecting the independent outputs based upon a combination of said rotor position signals;

said final power stages being connected to the independent outputs of said multi-channel analog multiplexer means;

a switch means being provided which is actuated by an external cut-in signal, the switch means being connected to an activation input of the multi-channel analog multiplexer means, said switch means reliably deactivating the multi-channel analog multiplexer means given absence of the cut-in signal; and said switch means actuated by said cut-in signal comprising a transistor switching stage whose emitter-collector path, together with a collector resistor is connected between an operating voltage forming said dc voltage source and ground, a collector thereof being connected to said activation input of said multi-channel analog multiplexer means and comprising a base circuit connected between a control input receiving said cut-in signal and ground, the base circuit comprising a decoupling diode dimensioned such that said transistor switching stage is held in a condition, given absence of said cut-in signals, which inhibits said analog multiplexer means.

4. A circuit arrangement for driving an electronically commutated dc motor with unipolarly operated motor windings, comprising:

a dc voltage source;

a final power stage allocated to each of the motor windings;

selection network means for connecting the dc voltage source to selected motor windings in a cyclical sequence through control of the respective final power stage and dependent on rotor position signals supplied to the selection network means;

means for creating the rotor position signals dependent on a position of a rotor of the motor;

said selection network means comprising a multi-channel analog multiplexer means having address inputs to which said rotor position signals are supplied, a common input to which a control voltage is supplied, and a plurality of independent outputs, said multiplexer means selecting the independent outputs based upon a combination of said rotor position signals;

said final power stages being connected to the independent outputs of said multi-channel analog multiplexer means; and a first comparator means being provided, an output thereof being connected to said common input of said multi-channel analog multiplexer means for supplying said control voltage, a first input of the comparator means being supplied with a signal having a magnitude based on an actual value of the motor current, and a second input thereof being supplied with a reference signal whose magnitude is based on a rated value of the motor current.

5. A circuit arrangement according to claim 4 wherein the output of said first comparator means is connected to an operating voltage via a further resistor and also to said common input of said analog multiplexer means.

6. A circuit arrangement according to claim 4 wherein a common intermediate resistor is connected to the motor windings via the respective final power stages, a voltage corresponding to the actual value of the motor current resulting at said common intermediate resistor, this voltage being supplied to the first input of said first comparator means; and a control resistor connected between ground and the second input of said first comparator means such that a current proportional to a rated value of the motor current results through the control resistor based on a voltage supplied at the first comparator means second input.

7. A circuit arrangement according to claim 6 wherein said final power stages each comprise a respective power transistor whose base is directly connected to an allocated output of said multi-channel analog multiplexer means and is also connected via a load resistor to said common intermediate resistor, and an emitter-collector path of the power transistor being connected between said common intermediate resistor and a circuit output which is in turn connectable to a terminal of the respective motor winding, the motor winding being connected via a winding star point to an operating voltage; and a smoothing capacitor connected between the collector of said power transistor and the respective output of said multi-channel analog multiplexer means.

8. A circuit arrangement according to claim 6 wherein an adjustable balancing resistor set in accordance with a prescribed nominal value of an amplitude of the motor current is connected to a junction of the first comparator means, the control resistor and a further resistor, said further resistor being connected to an external control input to which a control signal for the rated value of the motor current is supplied.

9. A circuit arrangement according to claim 8 wherein the control signal supplied to said external control input is a width-modulated digital pulse signal which in status-dependent fashion triggers a gradual acceleration or retardation of the dc motor, a resistive T circuit comprising two series resistors and a shunt resistor being inserted between said external control input and the second input of said first comparator means, said resistive T circuit being connected to ground via a capacitor such that said width-modulated digital pulse signal is converted into an analog signal at the control input.

10. A circuit arrangement according to claim 8 wherein a stabilized voltage source formed of a series connection of a resistor and a diode is connected between an operating voltage and ground, a junction of the resistor and diode being connected via a resistor and a forwardly polarized diode circuit to the second input of the first comparator means; a further, external control input connected via a coupling diode to a junction between the resistor and said forwardly polarized diode circuit; and a control signal at said external control input for driving the final power stages for fast run-up of the motor such that said coupling diode is inhibited in an active signal condition and maximum control current is impressed on said control resistor, or said coupling diode is coneuctive in a de-activated signal condition and diverts impressed current thereon and switches said control resistor in current-free fashion via said inhibited coupling diode.

11. A circuit arrangement according to claim 10 wherein a second comparator means is provided, a first input thereof being supplied with a stabilized dc as a reference value, and a second input thereof being supplied with one of said position signals, said second comparator means outputting a pulse-shaped reference signal a period of which is proportional to momentary motor speed.

12. A circuit arrangement according to claim 11 wherein said first input of said second comparator means is connected to a junction between a resistor connecting to an operating voltage and a Zener diode connecting to ground.

13. A circuit arrangement according to claim 1 wherein said means for creating the position signals for rotor position includes Hall elements with output stages having an open collector, said address inputs of said multi-channel analog multiplexer means being connected to an operating voltage via load resistors.

14. An electronically commutated dc motor system, comprising:
a dc motor having a plurality of motor windings connected in a star configuration;
Position sensing means for creating position signals indicative of a position of a rotor relative to the motor windings;
a respective power stage connected to an end of each motor winding;
a central point of the star connection connecting to a first terminal of a voltage source;
each power stage selectively connecting the respective motor winding to a second terminal of the dc voltage source;
selection network means having a plurality of outputs connected to respective power stages for cyclically activating the power stages in dependence upon the position signals connected to address inputs of the selection network means;
the selection network means having a common input to which a control voltage is supplied, said control voltage being developed by a comparator having first and second inputs;
an intermediate resistor being provided in common to each of the power stages, a first input of the comparator connecting to the intermediate resistor; and
a second input of the comparator connecting to a means for providing a signal corresponding to a rated value of motor current, the intermediate resistor providing a signal to the first input of the comparator corresponding to an actual value of the motor current.

15. A system according to claim 14 wherein the selection network means comprises an analog multiplexer.

16. An electronically commutated dc motor system, comprising:
a dc motor having a plurality of motor windings;
position sensing means for creating position signals indicative of a position of a rotor relative to the motor windings;
a respective power stage connected to respective motor windings;
an analog selection network means having a plurality of outputs connected to respective power stages for cyclically activating said respective power stages in dependence upon the position signals which are connected to address inputs of the selection network means;
said analog selection network means having a common input to which a control voltage is supplied, and for supplying drive signals at each of the outputs and controlling the rotor rotation and speed by varying amplitudes of the drive signals such that when said drive signals control said power stages, varying current amplitudes are employed for driving the motor windings; and
means for creating the control voltage dependent upon a measurement of actual motor current compared to rated motor current, said control voltage being fed to the analog selection network means.

* * * * *